Figures 1, 2:
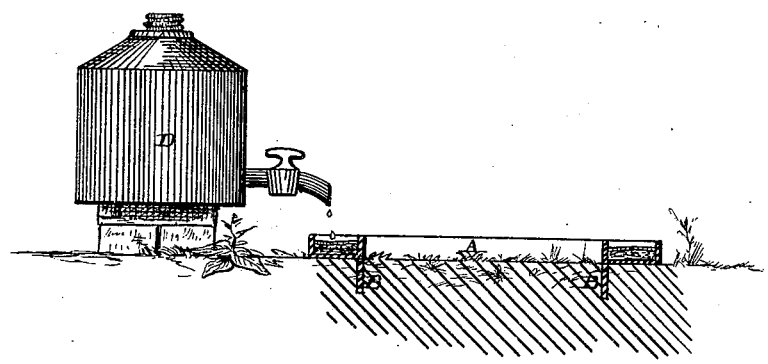

(No Model.)

F. T. PINTER.
INSECT DESTROYER.

No. 253,625. Patented Feb. 14, 1882.

Witnesses.
William W. Mortimer
W. H. Kern

Inventor
F. T. Pinter.
per
F. A. Lehmann,
Atty.

UNITED STATES PATENT OFFICE.

FRANCIS T. PINTER, OF SCHULENBURG, TEXAS.

INSECT-DESTROYER.

SPECIFICATION forming part of Letters Patent No. 253,625, dated February 14, 1882.

Application filed December 19, 1881. (No model.)

*To all whom it may concern:*

Be it known that I, F. T. PINTER, of Schulenburg, in the State of Texas, have invented certain new and useful Improvements in Insect-Destroyers; and I do hereby declare the following to be a full, clear, and exact description of the invention, such as will enable others skilled in the art to which it pertains to make and use it, reference being had to the accompanying drawings, which form part of this specification.

My invention relates to an improvement in insect-destroyers; and it consists in a grooved collar, ring, or flange, which is to be placed around the top of the ant-hole, and which is to be filled with some absorbent material that will hold a poisonous fluid, in combination with a can provided with a stop-cock, and which is placed in such relation to the collar that the poisonous fluid will drip from the cock into the collar, as will be more fully described hereinafter.

The object of my invention is to form a trap or destroyer for ants which can be placed around the top of their hole and then filled with some poisonous compound, so that when the ants attempt to crawl over the ring, frame, or collar they will be poisoned by the compound, and thus destroyed.

Figure 1 is a vertical section of my invention, shown in connection with a can for holding poisonous fluid. Fig. 2 is a vertical section of the collar or frame.

A represents a suitable frame, collar, or ring, which is grooved or recessed upon its top, so as to hold cotton or any other suitable materials which will act as an absorbent for the poisonous fluid by which the ants are to be destroyed. The shape here shown is square or rectangular; but I do not confine myself to this shape, for any other shape that may be preferred may be used. Projecting down from the inner edges of the frame is a suitable flange, B, which is to be forced into the ground, and thus make a close connection between the top of the ground and the bottom of the frame, and thus prevent the ants from crawling under the frame instead of over its top. In order to keep a constant supply of the poisonous fluid in the collar or frame, the can D, provided with a stop-cock, is used, and from which the flow of poisonous fluid into the frame can be readily regulated. Where the fluid is allowed to drop slowly into the frame there will always be a sufficient quantity retained in the absorbent material to poison the ants as they attempt to crawl over the frame to make their escape beyond. Were no means for keeping up the supply of fluid used, the poison would soon evaporate and in a comparatively short time become worthless.

Having thus described my invention, I claim—

The combination of the frame, collar, or ring, grooved upon its top so as to hold an absorbent material, and provided with the flange upon its under side, to be pressed into the earth, with a can provided with a stop-cock for holding the poisonous liquid, the can being placed in such relation to the collar that the fluid will drop from the cock into the collar, substantially as described.

In testimony whereof I affix my signature in presence of two witnesses.

FRANCIS T. PINTER.

Witnesses:
HUGO CHOTEK,
HENRY BERGER, Jr.